United States Patent [19]

Ochylski

[11] 4,092,762
[45] June 6, 1978

[54] HOG HEAD REMOVAL METHOD

[76] Inventor: Edward Ochylski, 9155 S. Pleasant, Chicago, Ill. 60620

[21] Appl. No.: 675,704

[22] Filed: Apr. 12, 1976

Related U.S. Application Data

[62] Division of Ser. No. 477,781, Jun. 10, 1974, Pat. No. 3,990,126.

[51] Int. Cl.² .............................................. A22B 3/00
[52] U.S. Cl. ........................................ 17/45; 17/1 R
[58] Field of Search .................... 17/45, 1 R, 52, 50, 17/21, 24, 23, 14, 17

[56] References Cited

U.S. PATENT DOCUMENTS

| | | | |
|---|---|---|---|
| 2,436,629 | 2/1948 | Carlsen | 17/1 R |
| 2,994,908 | 8/1961 | Fill | 17/1 R |
| 3,423,789 | 1/1969 | Ochylski | 17/21 |

FOREIGN PATENT DOCUMENTS 142,904   5/1961   U.S.S.R. .................................. 17/21

Primary Examiner—E. H. Eickholt
Attorney, Agent, or Firm—Cook, Wetzel & Egan, Ltd.

[57] ABSTRACT

A hog head is removed by suspending the carcass in a head-down position, marking the skin of the carcass around the neck, engaging a hook in the jaw of the carcass and applying force to the hook to rotate the head upwardly, and disengage the atlas joint whereby the head is substantially removed from the carcass. Continuous apparatus includes a head pulling structure running parallel to and synchronized with the carcass suspension system, and preferably horizontally offset therefrom, so that the carcass assumes a "bellydown" attitude when head-pulling force is applied thereto. Semi-continuous apparatus may apply the required force using a flywheel, a crank, a lever or a fluid cylinder.

11 Claims, 13 Drawing Figures

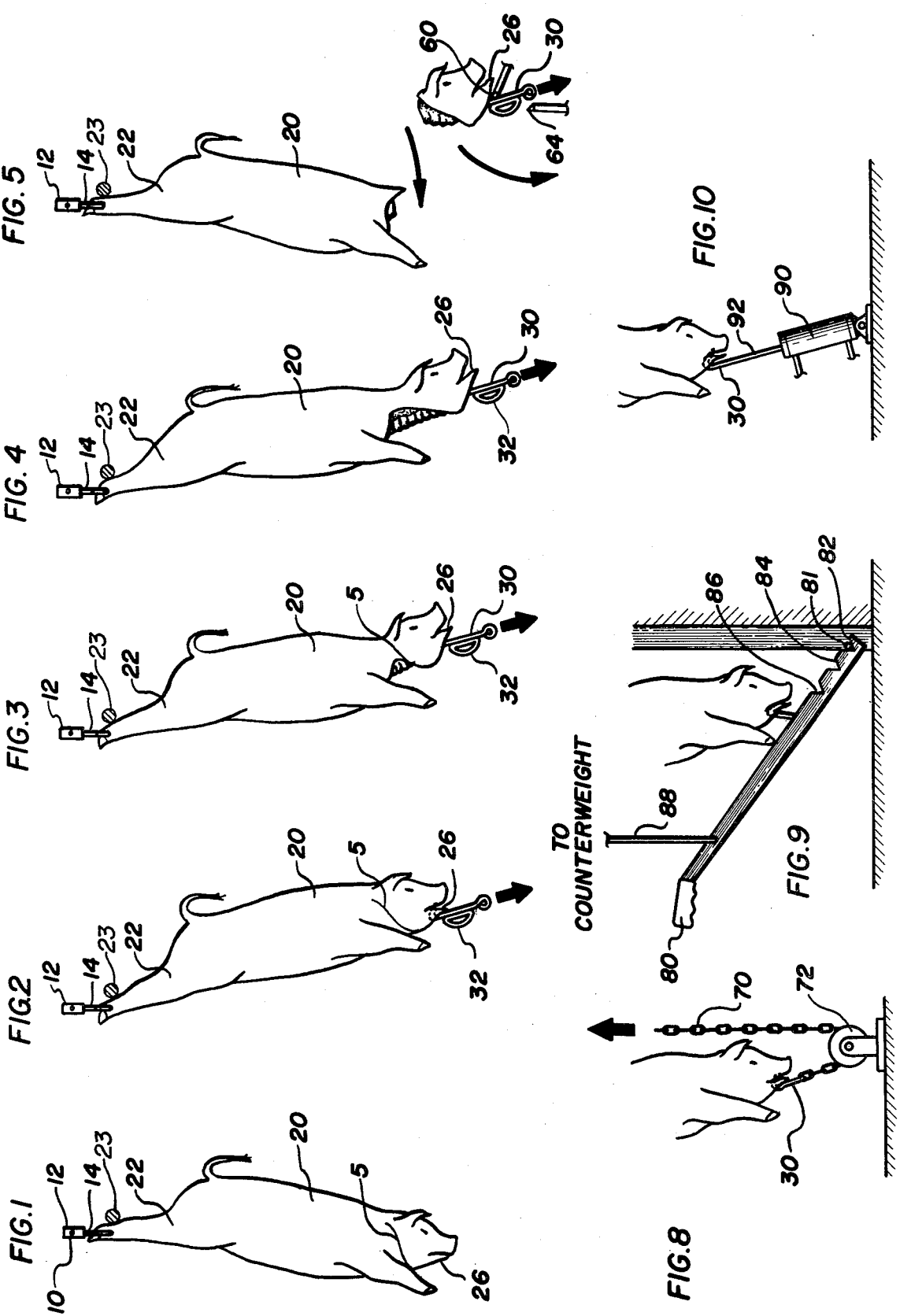

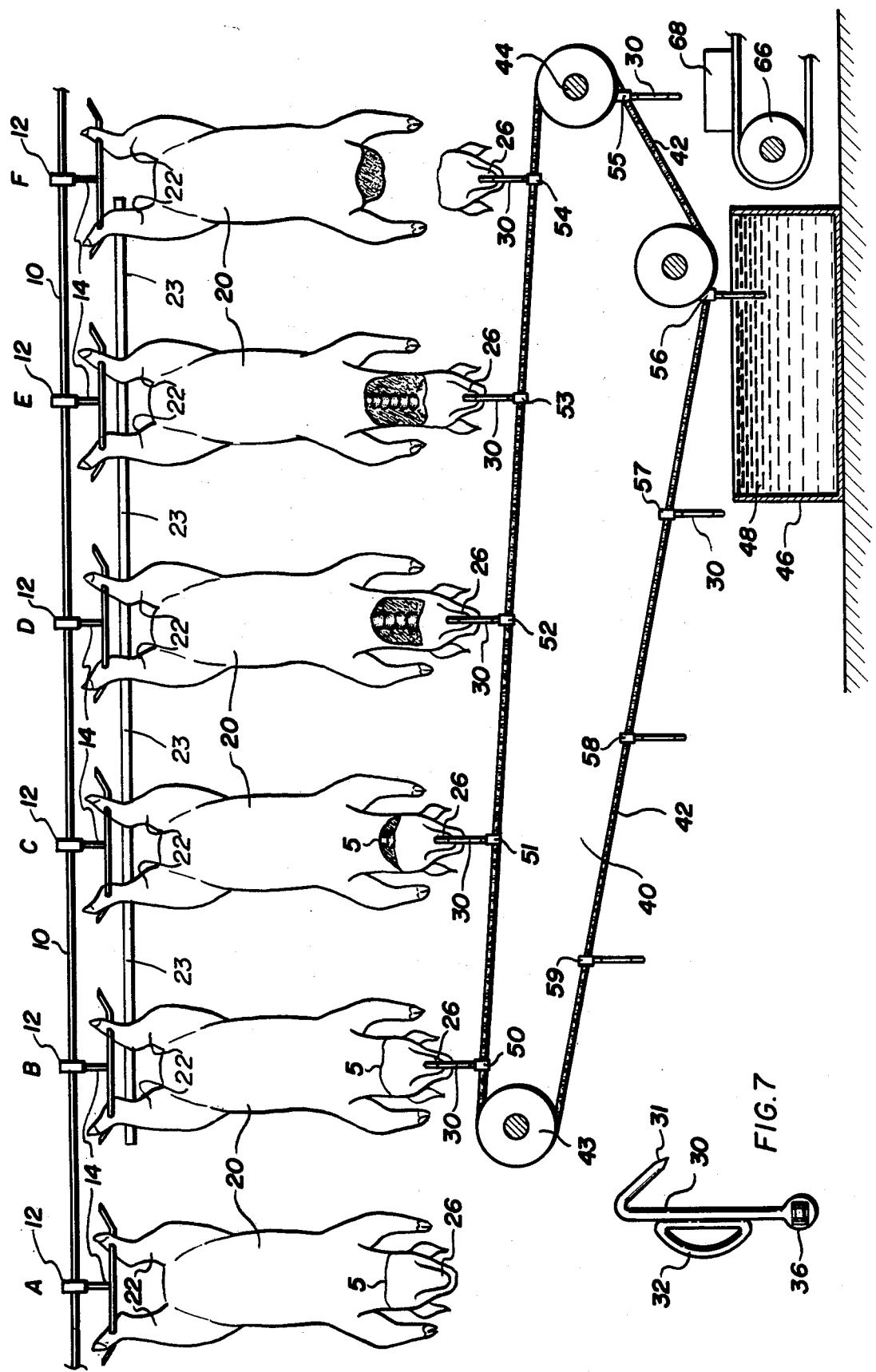

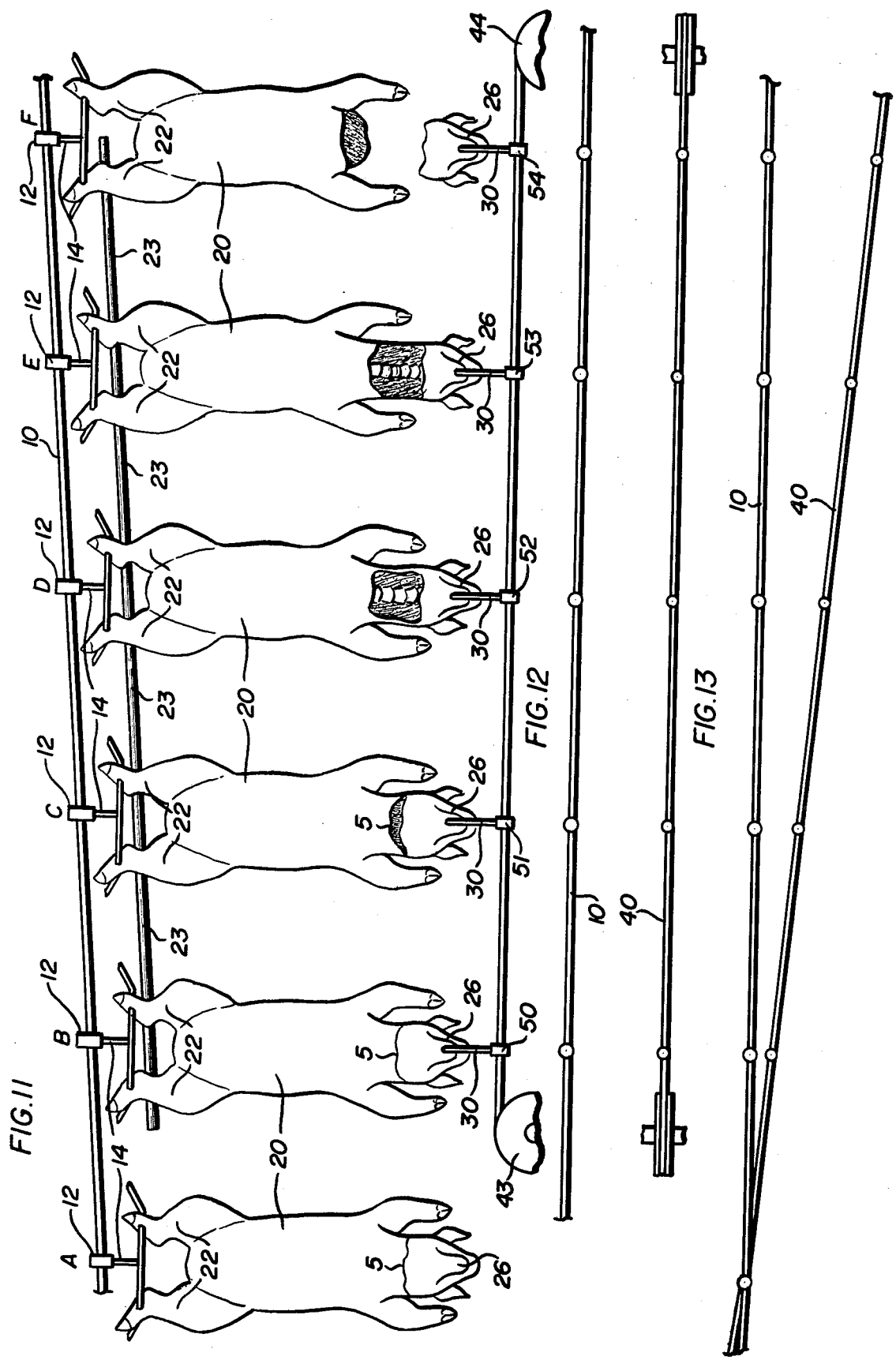

HOG HEAD REMOVAL METHOD

The present application is a division of pending application Ser. No. 477,781 filed June 10, 1974, now U.S. Pat. No. 3,990,126.

The present invention relates to a new and useful method for removing hog heads and apparatus for use in the removal of hog heads. In particular the present invention relates to a method and apparatus for continuously removing the heads from hog carcasses while the carcasses are moving on a rail conveyor through a head removal area.

In conventional packing house practice, hog carcasses are moved along the slaughtering floor on a conveyor rail, whereby the carcasses are continuously passed through the various butchering operations. One of the most difficult butchering operations, in conventional packing houses, is the removal of the head from the carcass. In order to remove the head it is necessary to break or otherwise disconnect the joint connecting the head to the spine (commonly known as the atlas joint), so that the head can be removed from the carcass, as the carcass continues along the conveyor rail.

The head removal is conventionally accomplished by cutting through the flesh and skin from the rear of the neck and then cutting around to the underside thereof, adjacent to the neck joint. Then the butcher must pull the head upwardly toward the back, which is usually done by grasping the ear manually to move the head to the desired position. At this point, the neck joint is disengaged and thereafter further cutting with the knife is required to separate the head from the carcass. Alternatively, the head will be left attached to the carcass by a small portion of skin, in order that the head may be inspected while it is still connected to the carcass.

The head removal operation is difficult and requires one or more highly skilled butchers to accomplish the operation on a conveyor line. The head removal operation is physically difficult, and requires considerable manual effort on the part of the butcher to disengage the atlas joint due to the lack of leverage and the like, particularly when working with hogs of considerable weight, and wherein a large number of hogs is processed within a given period of time. The fact that the hogs are of different sizes causes the heads to be at different elevations on the line, thus complicating the manual effort required. Such an operation can be extremely fatiguing, particularly for the butcher, and unless sufficient manpower is employed at this point in the operation, the entire processing operation can be slowed down.

Additionally, there are certain economic disadvantages to the manual removal of heads. The butcher cutting the skin and flesh towards the atlas joint has to guess the position of the joint and a slight error in the direction of cut often means that surplus flesh is left upon the head of the animal. Since the head meat demands a lower price per pound than the same meat if retained on the carcass, it is apparent that a small cutting error, multiplied by several thousand hogs, loses a considerable amount of revenue for the processors.

Some of the foregoing problems have been recognized by the prior art and various devices have been suggested to pull the heads from hogs using various types of machinery. Such machinery is described in U.S. Pat. No. 2,994,908.

The present invention overcomes the difficulties of the conventionally used manual operation, and overcomes the problems of the mechanical devices of the prior art through a method which employs a relatively simple machine adapted to remove the heads from hog carcasses continuously, while said carcasses are continuously moving along an overhead conveyor means, which is used to carry the hogs continuously through the butchering operation. Further, the present invention contemplates the removal of the heads of hogs of different size and/or length through a relatively simple operation, with the minimum amount of cutting, and the minimum amount of labor.

The method of the present invention can be carried out with a variety of different types of apparatus, as is discussed in detail below, but basically the method of the present invention does not require intricate or complicated machinery, thus avoiding the problem of maintaining complex or intricate machinery under difficult circumstances. It is well known that the slaughter area of a packing house is usually wet, and frequently subjected to dripping blood, and under the circumstances it is difficult to maintain complex machinery. Further, federal regulations in the United States require that any and all objects which come in contact with animal carcasses being butchered be sterilized regularly before contacting each animal carcass. In the case of complex head removal equipment, the sterilization requirements, combined with the maintenance problem has made the complex apparatus of the prior art impracticable for use in commercial operations.

The present invention contemplates removing the heads from hog carcasses or other animal carcasses by a process which involves the following steps:

(a) suspending the carcass in the head-down attitude;

(b) marking the skin or hide around the neck at the desired point;

(c) engaging a hook in the jaw of the carcass;

(d) applying a longitudinal force to the carcass through the jaw hook, whereby the head is rotated upwardly; and (e) continuing said force until the head is substantially removed from the carcass.

While the first three steps, i.e., steps (a), (b) and (c) may be performed in any desired order, it is considered essential to perform the first three steps prior to the fourth step, i.e., step (d) and the final step, i.e., step (e).

This process provides many advantages over the prior art in that the present invention reduces the amount of labor and requires only very limited amount of cutting by the butcher, and the method of the present invention removes the head leaving the maximum amount of meat on the carcass, where it is more valuable.

In the preferred embodiment, the present invention contemplates the removal of hog head from the hog carcass on a continuous basis, wherein the hogs are suspended by their hind legs, in the head down position, and are continuously moved through the deheading area. The present invention also contemplates apparatus, which continuously functions to remove the heads, and subsequently handles the separated heads as the carcasses are moved through the deheading area.

The advantages of the present invention will become apparent to those skilled in the art as hereinafter more particularly described, reference being had to the accompanying drawings in which:

FIG. 1 is a side view of an animal suspended from a conventional gambrel showing the attitude of the animal at the point the jaw hook is engaged, FIG. 2 is a side view of an animal as the pull or longitudinal force begins and the carcass is moved away from the vertical axis into a bellydown attitude;

FIG. 3 is a side view of an animal as the pull or longitudinal force begins to rotate the head upwardly;

FIG. 4 is a side view of an animal as the neck is elongated as the pull or longitudinal force continues;

FIG. 5 is a side view of a carcass with the head removed, showing the carcass back in the vertical position and the head falling downwardly;

FIG. 6 is a front elevational somewhat diagrammatic view, showing means for the continuous head removal, as the carcasses are moved from left to right, wherein the head pulling means descends gradually through the head removal area;

FIG. 7 is a hook means suitable for use to engage the jaw of the hog head;

FIG. 8 is a side view of an alternative device for pulling heads in which the hook is attached to a chain, which moves through where it is attached to the pulling force;

FIG. 9 is a side view of an alternative device for pulling heads which employs a lever for the pulling force;

FIG. 10 is a side view of another alternative apparatus which uses an air cylinder or a hydraulic cylinder for the pulling force.

FIG. 11 is a front elevational somewhat diagrammatic view, showing means for the continuous head removal, as the carcasses are moved from left to right, wherein the carcass suspension system ascends gradually as it moves through the head removal area;

FIG. 12 is a plan view of FIG. 6 or FIG. 11, showing the head pulling means parallel to, but horizontally offset from the carcass suspension system; and FIG. 13 is a plan view of another embodiment of FIG. 6 or FIG. 11, showing the offset, but wherein the head pulling means is mounted at an acute angle to the vertical plane beneath the carcass suspension system.

The present invention contemplates the removal of heads from hog carcasses by the application of a longitudinal force to the carcass, when the carcass is in the head-down position, which force fractures the neck joint and disengages the head from the carcass. While it is possible to remove the head from the carcass by applying a longitudinal force which is substantially vertical, it is preferred that the longitudinal force be offset from the vertical plane in a direction which causes the carcass to assume a slight "bellydown" attitude as the longitudinal tension is applied thereto. As is shown in FIGS. 2, 3 and 4, as the force is applied longitudinally to the carcass, it goes through three stages, each one requiring a different amount of force.

The hook 30 is initially engaged in the jaw, when the carcass is substantially vertical as is shown in FIG. 1. After the hook engages the jaw, a pulling means (not shown in FIGS. 1–5) applies a tension or longitudinal force to the carcass along an axis between the hind feet, at the gambrel 14 and the jaw hook 30 engaged in the jaw. In the preferred embodiment a longitudinal force which is somewhat offset from the vertical is applied to the carcass which is moved away from the vertical, and the carcass assumes a slight "bellydown attitude", as is shown in FIG. 2.

As the tension is continued, and the longitudinal force is continued, the atlas joint at the neck of the carcass is moved toward the axis of the longitudinal force, as is shown in FIG. 3. The movement of the atlas joint toward the axis of the longitudinal force causes the head to be rotated upwardly, as the neck is elongated, as is shown in FIG. 3.

As the atlas joint is moved toward the axis of the force as is shown in FIG. 3, the weight of the carcass, when the carcass is in the "bellydown" configuration, tends to accentuate the upward rotation of the head, thereby facilitating the disengagement of the atlas joint and the removal of the head. Positioning the axis of the longitudinal force offset from the vertical permits the weight of the carcass to assist in removing the head from the carcass, and it is for this reason the use of vertically offset pull is preferred.

A further advantage of using a force which is nonvertical exists in that the machine applying the force is not located directly below the carcass. Therefore, any blood or other matter which falls from the carcass as the head is removed does not fall on the machinery, but falls on the floor adjacent to the machine, thus facilitating clean-up and maintenance of the equipment. Finally, the use of a vertical offset as is shown in FIG. 5, determines in large measure the path in which the head will move when it is disengaged from the carcass. In other words, it will not drop directly onto the machinery, but will tend to swing to a point adjacent to and below the force applying apparatus.

The first step in the head removal operation, shown in FIG. 1, is the marking of the carcass hide around the neck, as shown by the cut 5. The marking, which may conveniently be accomplished with a conventional butcher's knife or by the use of a power driven knife, cuts through the hide around the neck of the carcass. While FIG. 1 illustrates the marking 5 being accomplished while the carcass is suspended from gambrel 14 by the hind legs, this is not required. In those packing houses wherein the carcass is suspended in the head-up attitude at some point in the operation, it is preferable to accomplish the marking while the carcass is in the head-up position, since the fore legs fall away from the area to be marked when the carcass is in the head-up position. Further, the area of the carcass which must be marked, i.e., the neck of the carcass, is at a relatively uniform height, irrespective of the size of the animal, when the animal is in the head-up attitude, thus facilitating the butcher's job.

The primary purpose of marking the carcass is to reduce the force required to fracture the atlas joint and remove the head from the carcass. It has been found that the hide of the carcass has a high tensile strength, and that failure to mark the carcass, particularly through the throat area, not only prevents the upward rotation of the head when the longitudinal force is applied, but requires that a great deal additional force be applied to disengage the atlas joint and remove the head. Therefore, it is considered essential to mark the carcass, at least through the throat area. Provided the carcass is marked through the throat area, the pulling force is reduced to the level required by the present invention, and the head may be removed with a force of 1000 pounds or less. As the head is removed the hide simply tears away around the balance of the neck.

Further, the marking of the carcass is important because it controls, to a significant extent, the location of the meat after the head is removed. Namely, the marking can determine which meat is left on the head and which meat is retained by the carcass. While it is usually desirable to accomplish the head removal operation in a manner which retains the maximum amount of meat on the carcass proper, there are instances where, due to market conditions, some portions of the meat are more desirable on the head portion. In accordance with the present invention, the marking is accomplished along a predetermined line of choice, and accurately controls the position of the meat after the head is removed.

A final consideration in determining the extent and location of the marking is the desirability of retaining the head in physical connection with the carcass, in order to facilitate inspection. Some inspection systems require the head to remain attached to the carcass. This can be accomplished by marking less than 360° of the hide, but permitting some of the hide to remain in tact. In this manner, when the atlas joint has been fractured and the head is substantially separated from the carcass, the head will remain attached to the carcass.

The depth of the cut of the marking is not critical, it being essential that the hide be substantially cut through in the marked areas. The first layer of fat may also be cut, but it is not necessary to do so. It is generally preferred that the marking not cut any significant depth of meat. Preferably the hide is marked below the jowls (on the snout side of the jowls) and behind the ears, as is shown by cut 5 of FIG. 1. As was mentioned above, the actual line of marking may be adjusted to cause different portions of meat to be retained by the head during the head removal operation.

A secondary purpose of the marking is to avoid tearing the hide when the head is removed. This aspect of marking assumes importance in those cases wherein the hide of the carcass is to be sold for leather.

The next step in the process, as is shown in FIG. 2, is to engage the jaw hook 30 in the jaw of the carcass. While it is possible to insert the jaw hook 30 in the carcass prior to the marking step, it is generally considered to be preferable to accomplish the marking first, in order to avoid the possibility of dulling the butchers' knives against the steel of the hook. The drawings illustrate the jaw hook 30 being engaged just prior to the head pulling operation, but the jaw hook may be inserted at any point prior to the pulling. As is illustrated by FIGS. 6, 8, 9 and 10, the hook may be affixed to the pulling means, but this is not required.

It is essential that the hook be inserted in the jaw in a manner to firmly engage the skeletal structure of the animal. The jaw bone of hogs, and particularly young hogs, is formed from two separate bones which are joined in the center by cartilage. The cartilage per se is not always strong enough to sustain the pulling force required to remove the head according to the present invention. Therefore it is preferred to engage the jaw hook 30 so that a significant amount of hide is contained therein, at the time the hook meets with and engages the bone structure of the lower jaw. In this way the force of longitudinal pull is distributed over most of the area of the lower jaw, thus reducing the tendency of the jaw bone to break.

It has been found that the hook may be conveniently engaged in the stick wound and that as the longitudinal force is gradually applied to the carcass, that the hook will move toward the point of the jaw and engage the jaw bone with sufficient hide and cartilage associated therewith to sustain the requisite longitudinal force.

The carcass is suspended in the head-down position for the head pulling steps. It is important that the carcass be suspended in a manner which will avoid rotation or twisting of the carcass about its vertical axis, when the longitudinal force is applied to the carcass. The tendency of the carcass to rotate during the application of the force tends to interfere with the upward rotation of the head, which in turn leads to a requirement of a higher force to remove the head, which may be greater than the jaw bone or the gambrel can sustain. Either result is undesirable, and it is therefore considered essential to suspend the carcass in a manner which will obviate the problem of rotation of the carcass about a vertical axis.

Those skilled in the art will be aware that conventional mechanisms may be used to avoid rotation. For instance, the carcass may be suspended with the feet attached to separate hooks on the rail 10. It is preferred to use a conventional gambrel 14 and either a guide bar 23 or a moving chain located parallel to the overhead rail 10 and moving at the same speed as the trolley 12. The chain may be positioned to bear against the hind feet of the animal, avoid rotation of the gambrel 14 about the vertical axis, and thereby prevent rotation of the carcass. The chain should be moving at a speed synchronized with the movement of the carcass as it moves along the overhead conveyor into the head pulling area. Following the head pulling area, the chain may be conveniently sterilized, using conventional techniques. Alternatively, various devices which prevent the gambrel 14 from rotating may be used.

Referring to the drawings, FIG. 6 illustrates the preferred embodiment of a continuous apparatus of the present invention. In FIG. 6 the carcasses 20 are suspended from an overhead conveyor 10, on which trolleys or wheels 12 are moving in a left-to-right direction from station A to station F. The carcass is attached to the trolleys 12 via the hind legs 22 through the use of gambrels or hooks or other grasping means 14. As was mentioned above, it is important to suspend the carcass 20 in a manner such to avoid rotation of the carcass about its vertical axis as the carcass proceeds along the conveyor 10 from station A to station B to station C. As is shown in FIG. 6, rotation may be avoided by the use of guide bar 23 which extends from station B through station F, and which prevents rotation of the gambrels 14. Preferably the carcass moves in the sideways attitude as is shown in FIG. 6, as is explained hereinbelow, which facilitates the desired offset and prevents the carcass from twisting during the head pulling operation.

The first step in the head removal operation as is explained above is the marking of the carcass hide around the neck. Preferably the hide is marked below the jowls and behind the ears. The hog carcass shown at stations A, B, and C of FIG. 6 illustrates the marking at 5, as do FIGS. 1, 2, and 3. It is generally desirable to mark the carcass below the jowls, so that when the head is removed, the jowls remain with the carcass, rather than the head.

The second step in the process is to engage jaw hook 30 in the jaw 26 of the carcass, as is shown at station B of FIG. 6. As is shown in more detail in FIG. 7, preferably jaw hook 30 contains a pointed end 31, and a hand holding means 32. Preferably the jaw hook 30 is made of stainless steel or other easily sterilizable metal in order to facilitate sterilization and compliance with federal regulations on sanitation of any instruments which come in contact with the carcass or penetrate the hide of a carcass.

The jaw hook must be attached to a pulling device capable of generating a force of up to 1000 pounds along the longitudinal axis of the carcass. In the preferred embodiment shown in FIG. 6, the jaw hook 30 is attached to the head removal means 40 by pivot point 36 which may be a flexible connection, a short length of chain or the like. Pivot point 36 enables the operator to grasp the hook 30 by the hand holding means 32 and to engage the point 31 in the jaw 26 of the carcass 20.

In a preferred embodiment the jaw hook 30 is attached to a head removal means 40 which includes a chain conveyor 42. The chain conveyor 42 descends from an elevated point near the carcass heads at roller 43, through a low point at drive wheel 44. Drive wheel 44 must be sufficiently low to facilitate the removal of the heads from the largest and longest carcasses to be processed. During its course of travel, chain conveyor 42 pulls downwardly on hooks 30, which are attached to chain 42, and moves said hooks through positions 50, 51, 52, 53 and 54, respectively.

It is important that chain conveyor 42 moves at a speed synchronized with overhead conveyor 10, whereby the hooks 30 maintain the same horizontal speed as the carcasses 20 move through the deheading operation. Thus there is substantially no twisting or turning of the carcass as it moves through the deheading area. It is preferred that the pulling device 40 be somewhat removed from the vertical plane beneath conveyor 10. As is more clearly shown by FIGS. 2, 3 and 4, the chain conveyor 42 is preferably horizontally offset from conveyor 10 whereby the carcass 20 is positioned in a "bellydown" attitude as the tension of the head puller 40 is applied thereto.

The vertical offset may be obtained by positioning the chain conveyor 42 at an acute angle to the line of overhead conveyor 10. In this embodiment, the highest point of chain conveyor 42 at roller 43, is approximately vertically beneath overhead conveyor 10, but as chain 42 descends from pulley 43 to drive wheel 44, it moves downward and away from the vertical plane beneath overhead conveyor 10. In this embodiment the head of the carcass at station A of FIG. 6 is closely positioned to the chain conveyor 42 in order to facilitate engaging the hook 30 in the jaw, or engaging the hook 30 with the pulling means 40.

As was mentioned above, the hook 30 is inserted in the jaw 26 of the carcass 20 at station A. As the carcass proceeds (in a left to right direction as is shown in FIG. 6) to station B, the carcass is taken under tension by the downward force applied by conveyor 42, as the hook 30 is moved to position 50 (as is shown in FIG. 2). FIG. 2 depicts the carcass, with no tension applied, whereby the carcass, in and about the neck takes a hump-back appearance, which is typical of hogs. As is shown in FIG. 3, when the tension is applied, the head is rotated upwardly. Since the carcass is suspended in a slightly "bellydown" attitude in accordance with the present invention, the weight of the carcass tends to accentuate upward rotation of the head.

As is shown in FIG. 6 when the carcass arrives at station F, the head is finally removed.

As is shown in FIG. 5, the hook 30 may be positioned by cam means 60 to tilt to the position shown in FIG. 5, wherein the hook 30 is retained by cam 64. In this attitude the head, which has now been removed from the carcass, may be automatically or manually freed from hook 30 and allowed to drop on to conveyor 66 shown in FIG. 6 which may be equipped with head retaining means, such as tray 68. Preferably the head retaining means is synchronized with the overhead conveyor 10 in order to maintain relationship between the head and the carcass and permit the Government inspection.

In the preferred embodiment, the head removal means 40 conveys the hooks on chain conveyor 42, and position 54 to position 55 where the hook enters tank 46 which is preferably filled with a sterilizing solution 48 such as hot water at position 56. The hook proceeds through the tank at position 56 to position 57, 58 and 59 whereupon it is ready to be engaged in another carcass jaw.

Jaw hook 30 may be permanently affixed to the chain conveyor 42 of the head removal means 40, but it is preferred that the hook means 30 be separable therefrom. When the hook 30 is separated, it may be inserted into the jaw of the carcass at any point in the butchering operation, ahead of the head removal station, and, when the carcass arrives at the head removal station, the hook means 30 may be engaged in a chain conveyor 42 at the head removal station as is explained above.

The preferred means of automatically disengaging the head from the hook is shown in the drawings, although the present invention contemplates the use of the hook to retain the head for inspection. This is most efficiently accomplished by providing a hook which is readily and automatically detachable from said chain conveyor 42. Alternatively, the chain conveyor 42 can be extended, beyond the drive wheel 44 shown in FIG. 1, and continue into a head inspection station and/or to a head boning station (not shown), whereafter the head is released from the hook for further processing.

The marking operation, which precedes the head pulling operation, may be done by various methods, which will be known to those skilled in the art. In addition to the use of conventional butcher knives, automatic knives may be employed. For instance, either reciprocating or rotary knives equipped with guards or guides which limit the depth of cut may be used in the marking step. In the marking operation, it is only essential to cut through the skin or hide. While additional cutting, including cutting of the outer layer of fat may be done during the marking operation, it is not essential, and is not preferred.

It is generally preferred, as is mentioned above, to cut the hide behind the ears and in front of the jowls. In so doing, substantially all of the jowls will be retained on the carcass when the head is removed. Further, it has been found that by employing a hook as is described above, whereby the head is rotated upwardly as the head is removed, permits the skull to pull away from the head meat, leaving the head meat with the carcass portion, where it is more valuable. Additionally, this process saves the labor required to manually remove the head meat from the skull.

The present invention also contemplates the removal of animal heads using a similar approach as is described for the continuous removal, but wherein the carcasses are not continuously moving in a horizontal direction, i.e., a semi-continuous operation. In such semi-continuous operations, the carcasses are suspended in a conventional manner, but are permitted to idle at the head removal station. The jaw of the carcass is then engaged by a hook which is preferably offset somewhat from the vertical as is explained for the preferred embodiment. Tension is applied to the hook, by a head pulling means, whereby the carcass is positioned in a "bellydown" position. As the force is continued, the atlas joint is disengaged and the head is detached from the carcass.

The apparatus used in the semi-continuous deheading operation may differ from the apparatus used in the continuous method. Several species of semi-continuous apparatus are shown in FIGS. 8, 9 and 10.

FIG. 8 illustrates a simple head removal apparatus wherein hook 30 is attached to chain or cable 70. Chain 70 extends through pulley 72 to a pulling force (not shown). The steps of pulling go through the same sequence as is shown in FIGS. 1 through 5. The pulling means used to generate the longitudinal force is not critical and various mechanisms may be used. For instance, chain 70 may be eccentrically attached to a large flywheel or crank, which will provide the hook 30 with oscillating motion up and down, wherein it can be engaged to the top of the upstroke, and pull the head from the carcass on the downstroke.

The lever device shown in FIG. 9 includes a lever 80 which is pivoted about fulcrum 82 which engages notch 81. Preferably lever 80 is equipped with several notches 84 and 86 which can engage fulcrum 82 to adjust the height of hook 30. It will be obvious that the mechanical advantage obtained by the lever is similarly adjusted as the notches are changed in the fulcrum. Since it is contemplated that a longitudinal force approaching 1,000 pounds is adequate to remove the head, using the system of the present invention, it is contemplated that a mechanical advantage of 6 to 1 or 10 to 1 could be adequately used. In installing a lever system as is shown in FIG. 9, it may be desirable to balance the lever by using a counterweight 88, to help balance the lever.

FIG. 10 illustrates a fluid operated cylinder 90, which may be either an air driven cylinder or a hydraulic cylinder, which can move piston extension 92 and thereby move hook 30. This provides a simple device which can produce the required longitudinal force on the carcass and quickly remove the head as is shown in FIGS. 1-5.

Those skilled in the art will be aware that other types of apparatus may be used to carry out the method of the present invention. For instance, the animal suspension system may rise vertically away from hook 30 to produce the required longitudinal force. In plants which have a low rate of kill, semi-continuous deheading apparatus may be preferable to the continuous apparatus described above.

The present invention may be used in connection with butchering processes in which the carcass is skinned, such as the process described and claimed in applicant's copending application Ser. No. 431,033, filed Jan. 7, 1974 now issued as U.S. Pat. No. 4,011,630. In such cases, the marking step of the present process may be curtailed or in some cases the marking may be eliminated.

While the present invention has been described in the context of the removal of heads from hog carcasses, it will be understood that the present invention, including both the method and the apparatus, may be used in the slaughter and dressing of other animals, such as cattle, calves, sheep and the like. Those skilled in the art will be aware that many variations may be made on the present invention and particularly to the apparatus described herein. The forms of invention herein shown and described are to be considered only as illustrative. It will be apparent to those skilled in the art that numerous modifications may be made therein without departure from the spirit of the invention or the scope of the appended claims.

What is claimed is:

1. A method of removing a head from a hog carcass which has been stuck which method comprises:
   suspending said carcass in the head-down position;
   marking the skin of the carcass around the neck;
   engaging a hook in the stick wound or in the jaw of said carcass;
   thereafter applying a substantially longitudinal force to said carcass through said hook, wherein said longitudinal force is offset from vertical, whereby the carcass is positioned in a "bellydown" attitude while the force is applied, and whereby the head is rotated upwardly about a horizontal axis; and
   continuing said force until the atlas joint is disengaged and said head is substantially removed from said carcass.

2. A method as described in claim 1, wherein the head is completely removed from the carcass.

3. A method as described in claim 1, wherein said marking is performed while the carcass is suspended by the hind legs.

4. A method as described in claim 1, wherein the marking is performed while the carcass is suspended in the head-up position.

5. A method as described in claim 1, wherein the hook is engaged in the jaw of the carcass before the carcass is suspended in the head-down position.

6. A method as described in claim 1, wherein said marking cuts through the hide below the jowls and behind the ears.

7. A method of removing a head from a hog carcass which has been stuck wherein said carcass is continuously moving horizontally while the deheading operation takes place, which method comprises:
   suspending said carcass in the head-down position;
   marking the skin of the carcass around the neck;
   engaging a hook in the stick wound or in the jaw of said carcass;
   thereafter applying a substantially longitudinal force to said carcass through said hook, wherein the means for applying the longitudinal force commences substantially vertically beneath said carcass, and gradually moves away from the vertical, whereby the longitudinal force causes said carcass to assume a "bellydown" attitude, whereby the head is rotated upwardly about a horizontal axis; and
   continuing said force until the atlas joint is disengaged and said head is substantially removed from said carcass.

8. A method of removing a head from a hog carcass which has been stuck wherein said carcass is continuously moving horizontally while the deheading operation takes place, which method comprises:
   suspending said carcass in the head-down position;
   marking the skin of the carcass around the neck;
   engaging a hook in the stick wound or in the jaw of said carcass;
   thereafter applying a substantially longitudinal force to said carcass through said hook, wherein the means for applying the longitudinal force is continuously moving parallel to the direction of and at the same speed as the carcass, whereby the head is rotated upwardly about a horizontal axis; and
   continuing said force until the atlas joint is disengaged and said head is substantially removed from said carcass.

9. A method as described in claim 8, wherein said longitudinal force positions said carcass in a "bellydown" attitude.

10. A method as described in claim 8, which includes conveying the removed head to a conveying system in synchronization with the movement of said carcass.

11. A method of removing a head from a hog carcass which has been struck and skinned, which process comprises:

suspending said skinned carcass in the head-down position;

engaging a hook in the jaw of said carcass;

thereafter applying a substantially longitudinal force to said carcass through said hook wherein said longitudinal force is offset from vertical whereby the carcass is positioned in a "bellydown" attitude while the force is applied, whereby the head is rotated upwardly about a horizontal axis; and continuing said force until the atlas joint is disengaged and said head is substantially removed from said carcass.

* * * * *